United States Patent
Nishio et al.

(10) Patent No.: US 7,738,675 B2
(45) Date of Patent: Jun. 15, 2010

(54) DECODING APPARATUS FOR CONTROLLING SEQUENCE OF OPERATIONS FOR A PLURALITY OF COPYRIGHT INFORMATION DETECTION SECTIONS

(75) Inventors: Kosuke Nishio, Osaka (JP); Takashi Katayama, Osaka (JP); Tomoki Ogawa, Osaka (JP)

(73) Assignee: Panasonic Corporation, Osaka (JP)

( * ) Notice: Subject to any disclaimer, the term of this patent is extended or adjusted under 35 U.S.C. 154(b) by 957 days.

(21) Appl. No.: 11/498,750

(22) Filed: Aug. 4, 2006

(65) Prior Publication Data

US 2007/0033145 A1    Feb. 8, 2007

(30) Foreign Application Priority Data

Aug. 5, 2005    (JP)    ............................. 2005-228596

(51) Int. Cl.
G06K 9/00 (2006.01)
G06K 9/36 (2006.01)
H04N 7/167 (2006.01)
H04L 9/32 (2006.01)

(52) U.S. Cl. ....................... 382/100; 382/232; 382/233; 380/201; 713/176

(58) Field of Classification Search ......... 380/200–203, 380/212, 216, 229, 230, 237, 239, 240; 726/27, 726/30–32; 382/100, 232, 250; 386/94–105; 705/57–59; 713/161, 165, 176, 189, 375, 713/502

See application file for complete search history.

(56) References Cited

U.S. PATENT DOCUMENTS

| | | | |
|---|---|---|---|
| 7,140,043 B2* | 11/2006 | Choi et al. | ..................... 726/26 |
| 2003/0156735 A1* | 8/2003 | Maes et al. | ................. 382/100 |
| 2004/0003253 A1* | 1/2004 | Ogino et al. | ................. 713/176 |

FOREIGN PATENT DOCUMENTS

WO    WO 02/065783 A1    8/2002

* cited by examiner

*Primary Examiner*—Tom Y Lu
*Assistant Examiner*—Thomas A Conway
(74) *Attorney, Agent, or Firm*—McDermott Will & Emery LLP

(57) ABSTRACT

A decoding apparatus includes: a decoding section for decoding input encoded data; an output section for outputting data decoded by the decoding section, in accordance with an output control signal; a plurality of copyright information detection sections for detecting different types of copyright information from the data decoded by the decoding section and each outputting the detected copyright information; an output control section for outputting the output control signal in accordance with the copyright information detected by at least one of the plurality of copyright information detection sections; and a detection control section for controlling the plurality of copyright information detection sections so that at least one of the plurality of copyright information detection sections has a period of time in which the at least one copyright information detection section does not perform process.

13 Claims, 8 Drawing Sheets

| TIME | m~2m | 2m~3m | 3m~4m | 4m~5m | 5m~6m |
|---|---|---|---|---|---|
| FIRST TYPE OF COPYRIGHT INFORMATION | DETECTION IS PERFORMED. | DETECTION IS PERFORMED. | DETECTION IS NOT PERFORMED. | DETECTION IS NOT PERFORMED. | DETECTION IS PERFORMED. |
| SECOND TYPE OF COPYRIGHT INFORMATION | DETECTION IS NOT PERFORMED. | DETECTION IS NOT PERFORMED. | DETECTION IS PERFORMED. | DETECTION IS PERFORMED. | DETECTION IS NOT PERFORMED. |

| TIME | m~2m | 2m~3m | 3m~4m | 4m~5m | 5m~6m |
|---|---|---|---|---|---|
| FIRST TYPE OF COPYRIGHT INFORMATION | DETECTION IS PERFORMED. | DETECTION IS PERFORMED. | DETECTION IS PERFORMED. (Small amount of computation) | DETECTION IS PERFORMED. | DETECTION IS PERFORMED. |
| SECOND TYPE OF COPYRIGHT INFORMATION | DETECTION IS NOT PERFORMED. | DETECTION IS NOT PERFORMED. | DETECTION IS PERFORMED. | DETECTION IS NOT PERFORMED. | DETECTION IS NOT PERFORMED. |

| TIME | m~2m | 2m~3m | 3m~4m | 4m~5m | 5m~6m |
|---|---|---|---|---|---|
| FIRST TYPE OF COPYRIGHT INFORMATION | DETECTION IS NOT PERFORMED. | DETECTION IS NOT PERFORMED. | DETECTION IS PERFORMED. | DETECTION IS NOT PERFORMED. | DETECTION IS NOT PERFORMED. |
| SECOND TYPE OF COPYRIGHT INFORMATION | DETECTION IS PERFORMED. | DETECTION IS PERFORMED. | DETECTION IS PERFORMED. (Simplified detection) | DETECTION IS PERFORMED. | DETECTION IS PERFORMED. |

FIG.6

| TIME | m~2m | 2m~3m | 3m~4m | 4m~5m | 5m~6m |
|---|---|---|---|---|---|
| FIRST TYPE OF COPYRIGHT INFORMATION | DETECTION IS PERFORMED. | DETECTION IS PERFORMED. | DETECTION IS NOT PERFORMED. | DETECTION IS NOT PERFORMED. | DETECTION IS PERFORMED. |
| SECOND TYPE OF COPYRIGHT INFORMATION | DETECTION IS NOT PERFORMED. | DETECTION IS NOT PERFORMED. | DETECTION IS PERFORMED. | DETECTION IS PERFORMED. | DETECTION IS NOT PERFORMED. |

| TIME | m~2m | 2m~3m | 3m~4m | 4m~5m | 5m~6m |
|---|---|---|---|---|---|
| FIRST TYPE OF COPYRIGHT INFORMATION | DETECTION IS PERFORMED. | DETECTION IS PERFORMED. | DETECTION IS PERFORMED. | DETECTION IS PERFORMED. | DETECTION IS PERFORMED. |
| SECOND TYPE OF COPYRIGHT INFORMATION | DETECTION IS NOT PERFORMED. | DETECTION IS NOT PERFORMED. | DETECTION IS NOT PERFORMED. | DETECTION IS NOT PERFORMED. | DETECTION IS NOT PERFORMED. |

DECODING APPARATUS FOR CONTROLLING SEQUENCE OF OPERATIONS FOR A PLURALITY OF COPYRIGHT INFORMATION DETECTION SECTIONS

BACKGROUND OF THE INVENTION

The present invention relates to a decoding apparatus for decoding encoded video and audio data, and particularly relates to copyright protection technology.

The amount of information in digitized video and audio data is usually reduced by high-efficiency coding process and then the resultant data is multiplexed so as to be recorded on a recording medium or transmitted. The major examples of the recording medium include a DVD (Digital Versatile Disc). The major examples of the transmission include distribution via digital television broadcast or the Internet.

Video data is encoded mainly according to the MPEG-2 (Moving Picture Experts Group-2) standard, the MPEG-4 standard, or the like, while audio data is encoded mainly in accordance with Dolby Digital, DTS (Digital Theater Systems), MPEG Audio, PCM (Pulse Code Modulation), or the like.

Audio data encoded according to these encoding methods will be hereinafter referred to as "encoded audio data". In many cases, multiple channels of audio data are encoded as encoded audio data.

If video and audio are converted into digital data, they can be recorded or transmitted more conveniently, while replication thereof without degradation becomes possible, leading to the problem of copyright infringement. In order to deal with this problem, a technique for embedding copyright information in video and audio data has been developed. Although detailed explanation of this technique will be omitted herein, this kind of technique has already been employed in DVD-Audio and the like, for example.

In the future, multiple types of copyright protection techniques may be employed according to the characteristics of contents. In that case, when a medium on which a plurality of contents can be recorded is played back, it is necessary to detect multiple types of copyright information.

For example, the pamphlet of International Publication No. WO2002/065783 discloses a technique for detecting two kinds of copyright information for images.

The disclosed technique, however, achieves commonality of processing by taking advantage of the fact that these two types of copyright information are both for images. Techniques to be developed in the future will not necessarily have commonalities with the prior technique. Therefore, detection of multiple types of copyright information may require simultaneous operation of a plurality of copyright information detectors, which may cause an increase in the amount of computation necessary for the detection.

SUMMARY OF THE INVENTION

It is an object of the present invention to provide a decoding apparatus in which when copyright information is detected from data that contains multiple types of copyright information, the amount of computation required for the detection is reduced.

More specifically, an inventive decoding apparatus includes: a decoding section for decoding input encoded data; an output section for outputting data decoded by the decoding section, in accordance with an output control signal; a plurality of copyright information detection sections for detecting different types of copyright information from the data decoded by the decoding section and each outputting the detected copyright information; an output control section for outputting the output control signal in accordance with the copyright information detected by at least one of the plurality of copyright information detection sections; and a detection control section for controlling the plurality of copyright information detection sections so that at least one of the plurality of copyright information detection sections has a period of time in which the at least one copyright information detection section does not perform process.

In the inventive decoding apparatus, all of the plurality of copyright information detection sections do not perform operation for detecting copyright information at all times. Therefore, when copyright information is detected from data that contains multiple types of copyright information, the amount of computation required for the detection can be reduced.

As described above, according to the present invention, it is possible to reduce the amount of computation required for copyright information detection, and it is therefore possible to lower processing capability required for data processing.

DETAILED DESCRIPTION OF THE INVENTION

Hereinafter, embodiments of the present invention will be described with reference to the accompanying drawings.

First Embodiment

Figure 1:
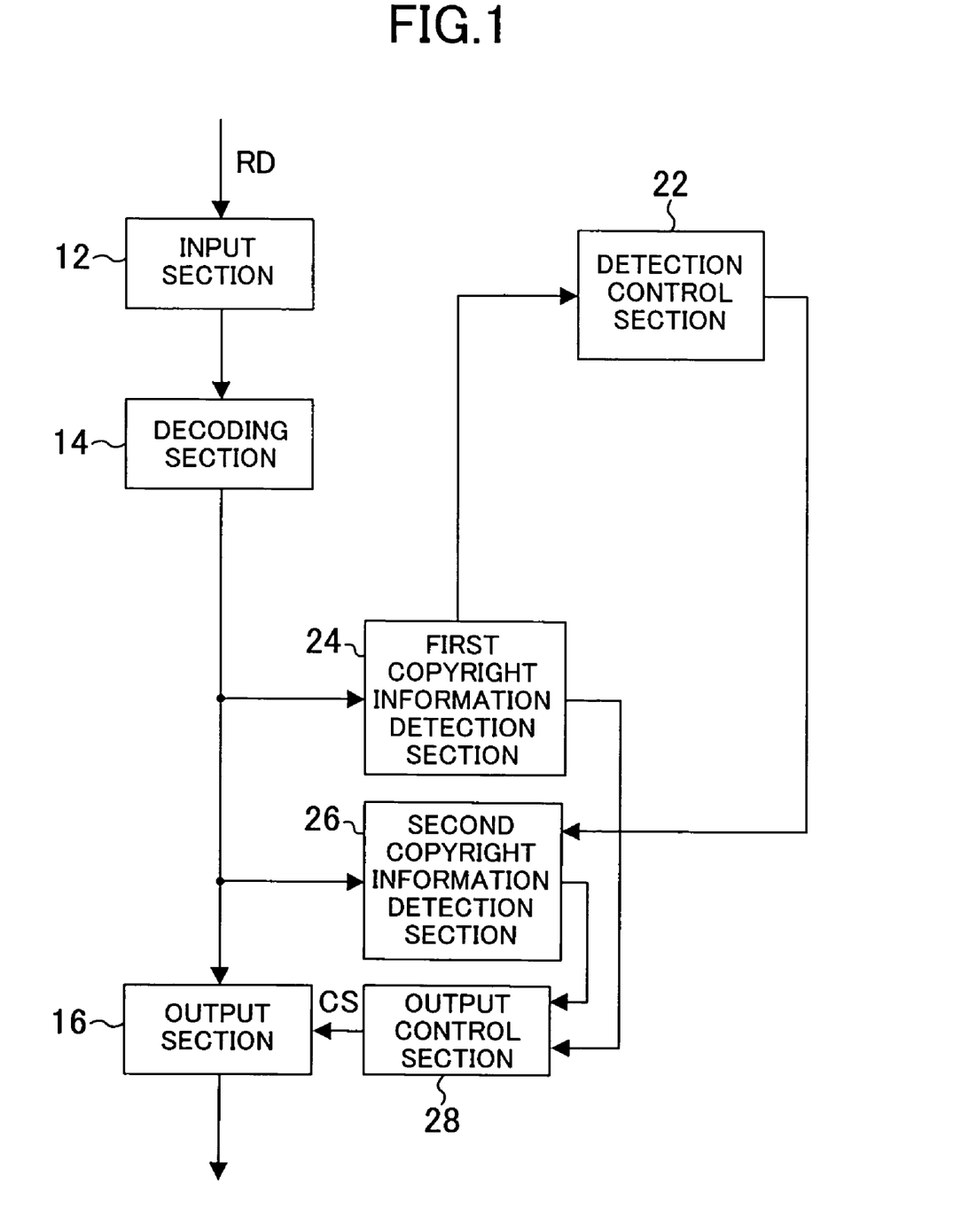
FIG. 1 is a block diagram of a decoding apparatus according to a first embodiment of the present invention.

FIG. 1 is a block diagram of a decoding apparatus according to a first embodiment of the present invention. The decoding apparatus of FIG. 1 includes an input section 12, a decoding section 14, an output section 16, a detection control section 22, a first copyright information detection section 24, a second copyright information detection section 26, and an output control section 28. The decoding apparatus of FIG. 1 is used in a DVD player with audio watermark detection capability, for example.

In the decoding apparatus of FIG. 1, at least one of the copyright information detection sections is always operated, and in accordance with the state of the detection process performed by at least one of those operated copyright information detection sections, the copyright information detection section that has not been operated is made to perform detection process.

Data RD containing contents read from a DVD, for example, is input into the input section 12. In the data RD, encoded video data and encoded audio data have been multiplexed together. In the encoded audio data in the data RD, first and second types of copyright information are embedded as watermarks. The input section 12 divides the input data RD into the encoded video data and the encoded audio data so as to output the obtained encoded video and audio data to the decoding section 14.

The decoding section 14 decodes the encoded video and audio data according to the MPEG-2 standard or the like to output the obtained decoded video and audio data to the output section 16 and to the first and second copyright information detection sections 24 and 26. The output section 16 outputs the decoded video and audio data in accordance with an output control signal CS output from the output control section 28.

The first copyright information detection section 24 detects the first type of copyright information embedded in the decoded audio data and outputs the detected copyright information and the amount of computation required for the detection to the output control section 28. When the amount of computation obtained by the first copyright information detection section 24 is smaller than a predetermined value, the detection control section 22 makes the second copyright information detection section 26 perform copyright information detection process.

For example, when the first copyright information detection section 24 is not performing process that requires the amount of computation equal to or greater than the amount of computation obtained by subtracting the amount of computation necessary for the second copyright information detection section 26 from the amount of computation allocated to the first copyright information detection section 24, in other words, when the result obtained by subtracting the amount of computation obtained by the first copyright information detection section 24 from the amount of computation allocated to the first copyright information detection section 24 is greater than the amount of computation necessary for the second copyright information detection section 26, the detection control section 22 makes the second copyright information detection section 26 perform copyright information detection process.

The second copyright information detection section 26 detects the second type of copyright information embedded in the decoded audio data, under control of the detection control section 22 and outputs the detected copyright information to the output control section 28.

The output control section 28 generates and outputs the output control signal CS for controlling the output process of the output section 16, in accordance with the outputs of the first and second copyright information detection sections 24 and 26. In particular, when the output control section 28 has determined, based on at least either the detected first or second copyright information, that the contents being played back are unauthorized contents, the output control section 28 outputs the output control signal CS so as to stop the output of the output section 16. In the other cases, the output control section 28 outputs the output control signal CS so as to allow the output of the output section 16.

Figure 2:
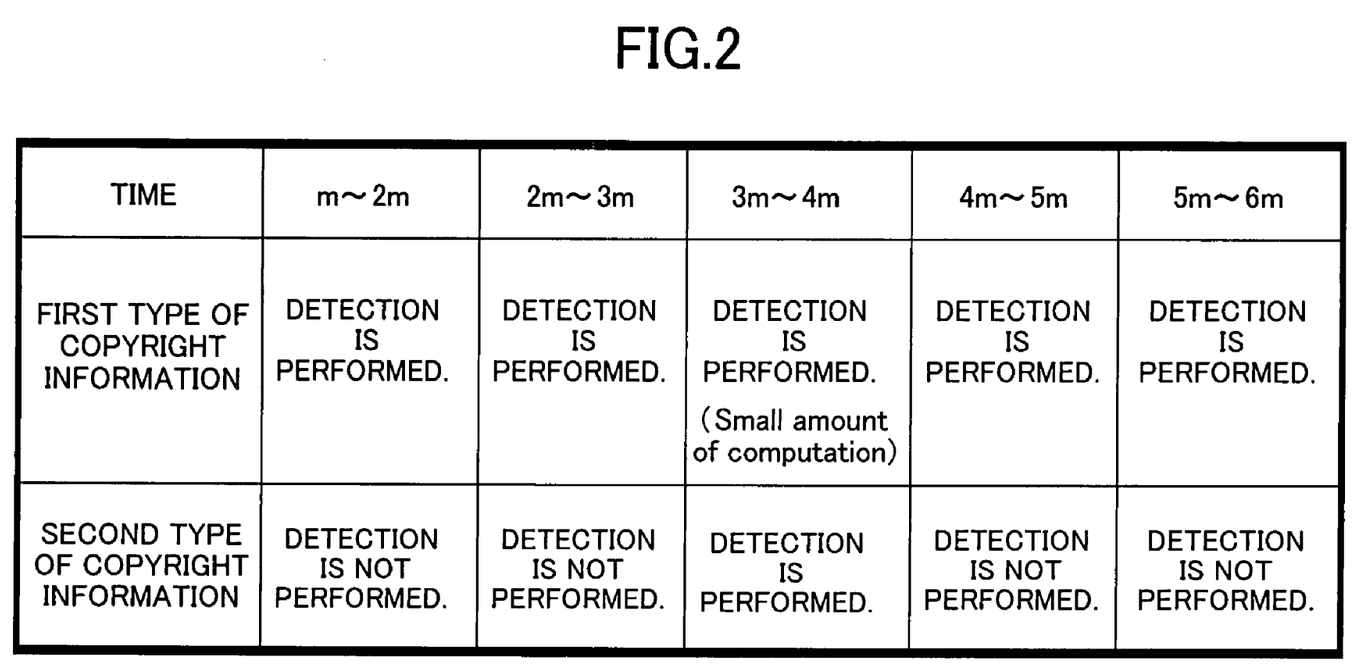
FIG. 2 is an explanatory view illustrating time periods in which first and second copyright information detection sections of FIG. 1 perform copyright information detection process.

FIG. 2 is an explanatory view illustrating time periods in which the first and second copyright information detection sections 24 and 26 of FIG. 1 perform copyright information detection process. In FIG. 2, the presence/absence of detection process is indicated for each time period, which is a specified length of time m. However, the time periods may be established so that each time period corresponds to a certain number of samples in decoded data. This also applies to the subsequent figures.

During the period from when time t=m to when time t=3 m, the first copyright information detection section 24 performs copyright information detection process, and the amount of computation required for the detection exceeds a predetermined value. Therefore, the detection control section 22 does not make the second copyright information detection section 26 perform copyright information detection process during this period.

During the period from when time t=3 m to when time t=4 m, the first copyright information detection section 24 performs copyright information detection process, and the amount of computation required for the detection is small and does not exceed the predetermined value, such that the detection control section 22 makes the second copyright information detection section 26 perform copyright information detection process. During the period from when time t=4 m to when time t=6 m, copyright information detection is performed in the same manner as in the period from when time t=m to when time t=3 m.

As described above, in the decoding apparatus of FIG. 1, it is not necessary to operate the two copyright information detection sections at all times, which allows the two types of copyright information to be detected with the amount of required computation being reduced.

Although the output control section 28 and the detection control section 22 are provided in the foregoing description, these sections may be realized as a single control section.

Second Embodiment

Figure 3:
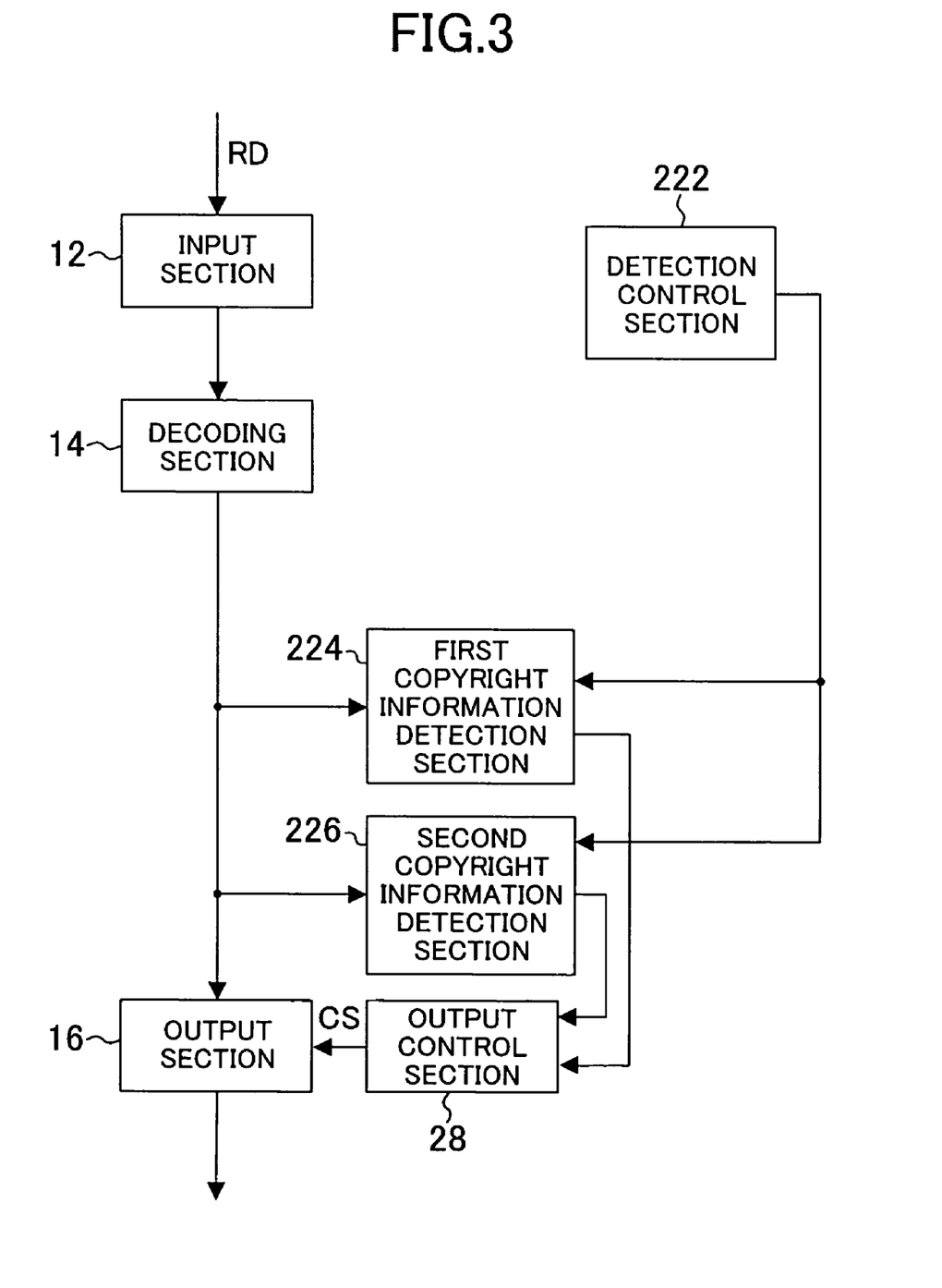
FIG. 3 is a block diagram of a decoding apparatus according to a second embodiment of the present invention.

FIG. 3 is a block diagram of a decoding apparatus according to a second embodiment of the present invention. The decoding apparatus of FIG. 3 includes a detection control section 222, a first copyright information detection section 224, and a second copyright information detection section 226 in place of the detection control section 22, the first copyright information detection section 24, and the second copyright information detection section 26 of the decoding apparatus of FIG. 1, respectively. In FIG. 3, the same members as those described with reference to FIG. 1 are identified by the same reference numerals and the description thereof will be omitted herein.

In the decoding apparatus of FIG. 3, the way in which one of the copyright information detection sections performs detection process is changed, and the other copyright information detection section also performs detection process while the one copyright information detection section performs the detection process in the changed manner.

The first copyright information detection section 224 of FIG. 3 detects a first type of copyright information embedded in decoded audio data under control of the detection control section 222 and outputs the detected copyright information to the output control section 28. The second copyright information detection section 226 detects a second type of copyright information embedded in the decoded audio data under control of the detection control section 222 and outputs the detected copyright information to the output control section 28.

The detection control section 222 makes the first copyright information detection section 224 operate only for a certain period of time. And during the time period in which the first copyright information detection section 224 is operated, the detection control section 222 makes the second copyright information detection section 226 perform only minimum necessary operation so as to detect copyright information in a simplified manner. The amount of computation required for the simplified detection is smaller than the amount of computation obtained by subtracting the amount of computation required for the first copyright information detection section 224 from the amount of computation allocated to the second copyright information detection section 226. The output control section 28 functions in the same manner as in the decoding apparatus of FIG. 1 except that the output control section 28 generates an output control signal CS according to the outputs of the first and second copyright information detection sections 224 and 226.

Figure 4:
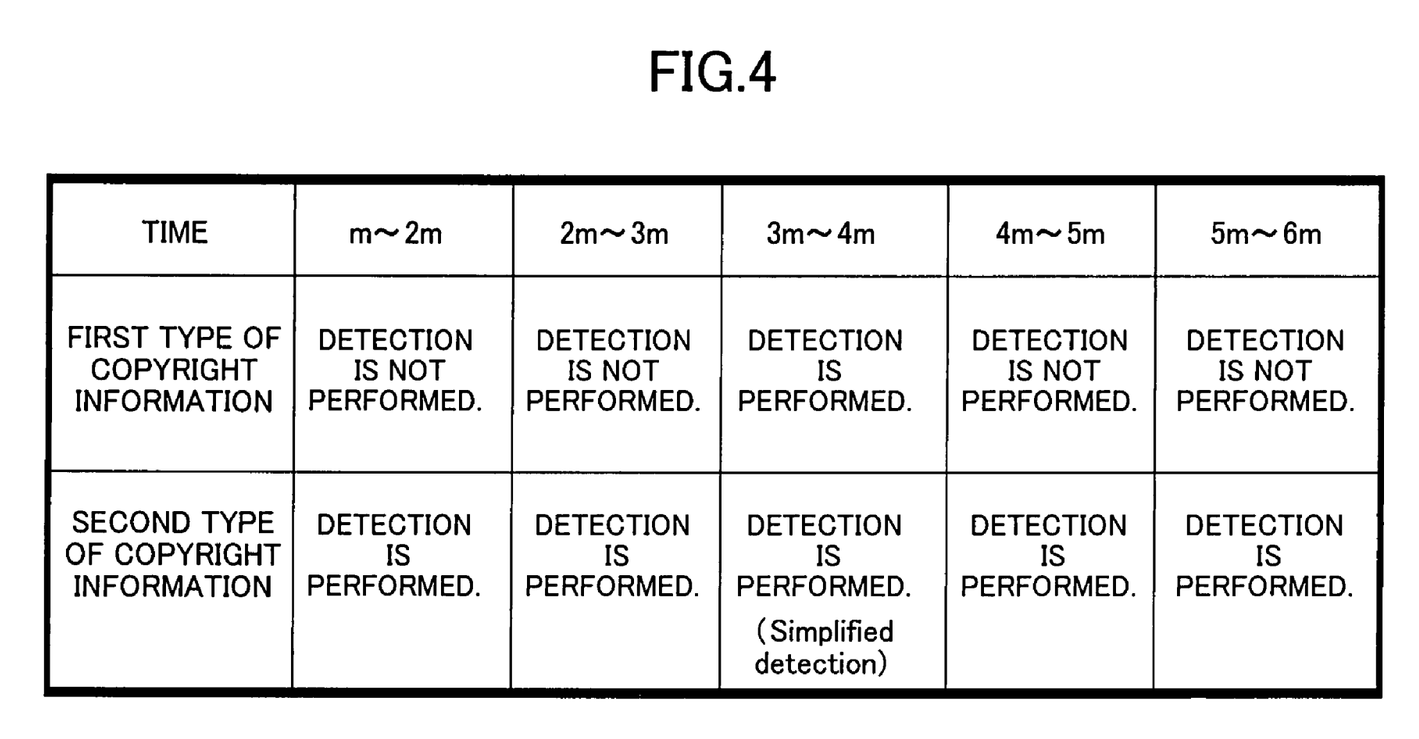
FIG. 4 is an explanatory view illustrating time periods in which first and second copyright information detection sections of FIG. 3 perform copyright information detection process.

FIG. 4 is an explanatory view illustrating time periods in which the first and second copyright information detection sections 224 and 226 of FIG. 3 perform copyright information detection process.

During the period from when time t=m to when time t=3 m, the detection control section 222 does not let the first copyright information detection section 224 perform copyright information detection process, while making the second copyright information detection section 226 perform copyright information detection process.

During the period from when time t=3m to when time t=4m, the detection control section 222 makes the first copyright information detection section 224 perform copyright information detection process. During this time period, the detection control section 222 makes the second copyright information detection section 226 perform copyright information detection process in a different manner, that is, in a simplified manner. To perform the simplified detection, the second copyright information detection section 226 may change the computational precision in performing the detection process, or may omit part of the process, for example. The simplified detection may be any process, so long as the amount of required computation is reduced. During the period from when time t=4m to when time t=6m, copyright information detection is performed in the same manner as in the period from when time t=m to when time t=3m.

As described above, in the decoding apparatus of FIG. 3, it is also not necessary to operate the two copyright information detection sections at all times, which allows the two types of copyright information to be detected with the amount of required computation being reduced.

Although the output control section 28 and the detection control section 222 are provided in the foregoing description, these sections may be realized as a single control section.

Third Embodiment

Figure 5:
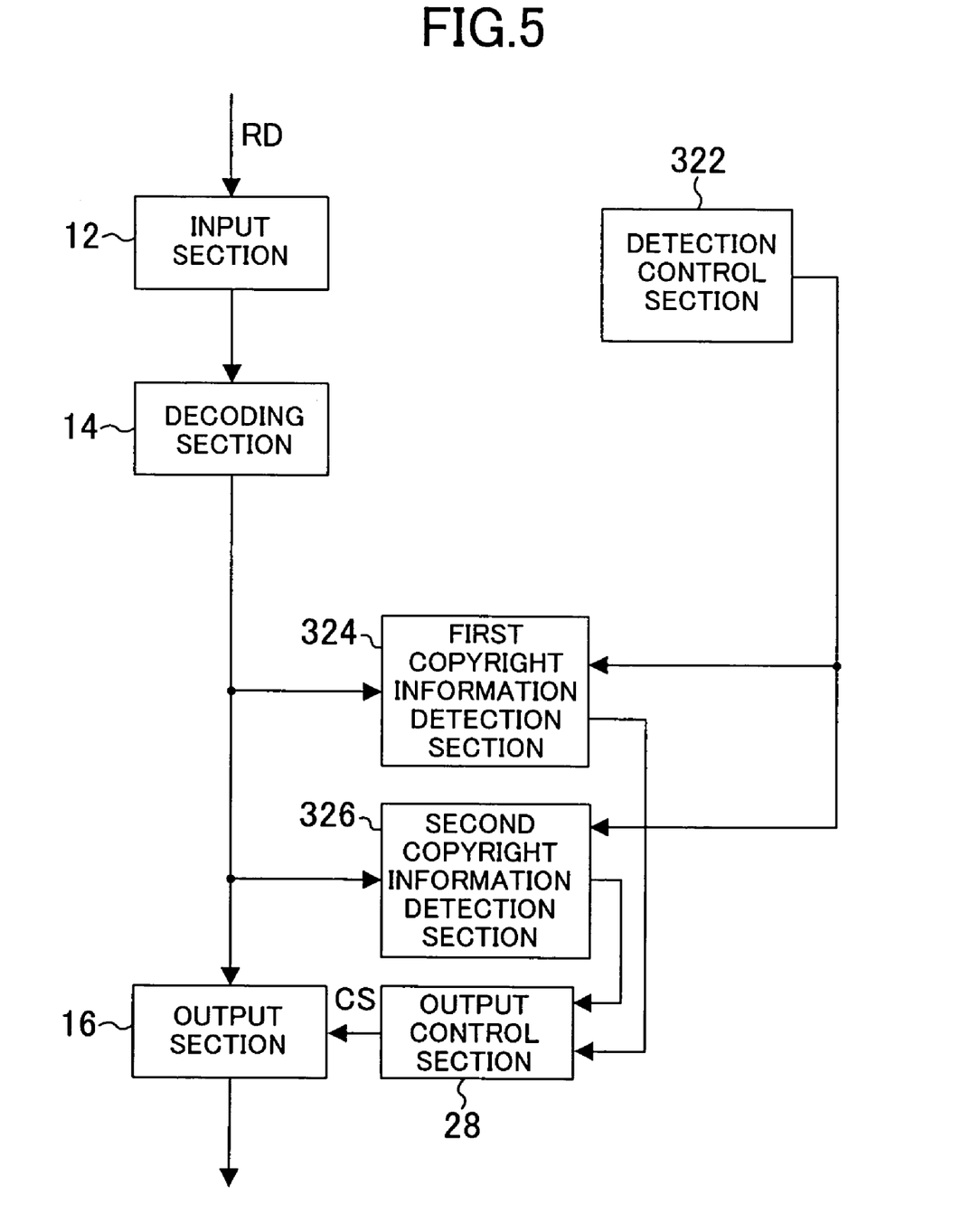
FIG. 5 is a block diagram of a decoding apparatus according to a third embodiment of the present invention.

FIG. 5 is a block diagram of a decoding apparatus according to a third embodiment of the present invention. The decoding apparatus of FIG. 5 includes a detection control section 322, a first copyright information detection section 324, and a second copyright information detection section 326 in place of the detection control section 22, the first copyright information detection section 24, and the second copyright information detection section 26 of the decoding apparatus of FIG. 1, respectively. In FIG. 5, the same members as those described with reference to FIG. 1 are identified by the same reference numerals and the description thereof will be omitted herein.

In the decoding apparatus of FIG. 5, the plurality of copyright information detection sections are operated in a time-shared manner, and in particular, the first copyright information detection section 324 and the second copyright information detection section 326 alternately perform copyright information detection process.

The first copyright information detection section 324 of FIG. 5 detects a first type of copyright information embedded in decoded audio data under control of the detection control section 322 and outputs the detected copyright information to the output control section 28. The second copyright information detection section 326 detects a second type of copyright information embedded in the decoded audio data under control of the detection control section 322 and outputs the detected copyright information to the output control section 28.

The detection control section 322 repeats the process of operating the first copyright information detection section 324 for a certain period of time and then operating the second copyright information detection section 326 for a certain period of time. The output control section 28 functions in the same manner as in the decoding apparatus of FIG. 1 except that the output control section 28 generates an output control signal CS according to the outputs of the first and second copyright information detection sections 324 and 326.

Figure 6:
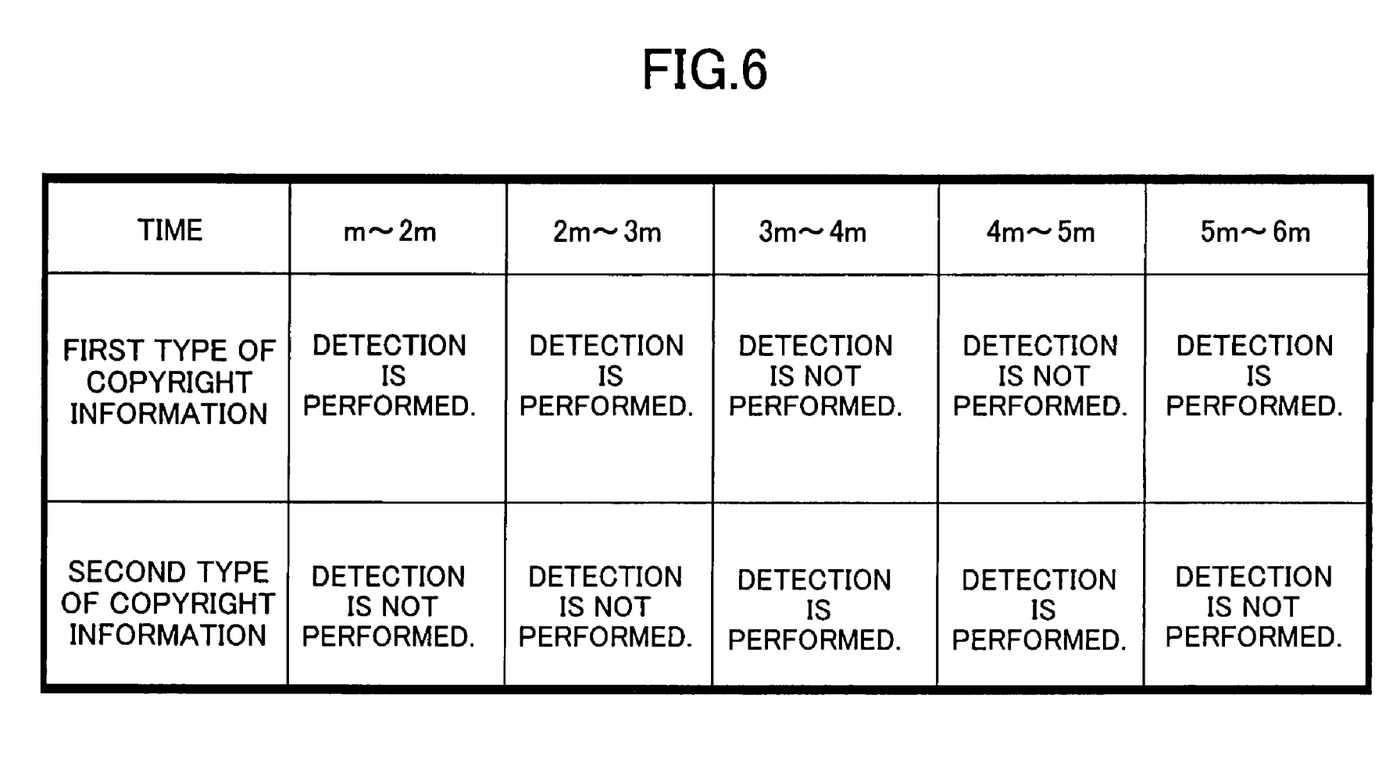
FIG. 6 is an explanatory view illustrating time periods in which first and second copyright information detection sections of FIG. 5 perform copyright information detection process.

FIG. 6 is an explanatory view illustrating time periods in which the first and second copyright information detection sections 324 and 326 of FIG. 5 perform copyright information detection process.

During the period from when time t=m to when time t=3m, the detection control section 322 makes the first copyright information detection section 324 perform copyright information detection process, while the detection control section 322 does not make the second copyright information detection section 326 perform copyright information detection process.

During the period from when time t=3 m to when time t=5 m, the detection control section 322 does not let the first copyright information detection section 324 perform copyright information detection process, while the detection control section 322 makes the second copyright information detection section 326 perform copyright information detection process. After time t=5 m, the above-described operation is repeated.

As described above, in the decoding apparatus of FIG. 5, it is also not necessary to operate the two copyright information detection sections at all times, which allows the two types of copyright information to be detected with the amount of required computation being reduced.

Although the output control section 28 and the detection control section 322 are provided in the foregoing description, these sections may be realized as a single control section.

Fourth Embodiment

Figure 7:
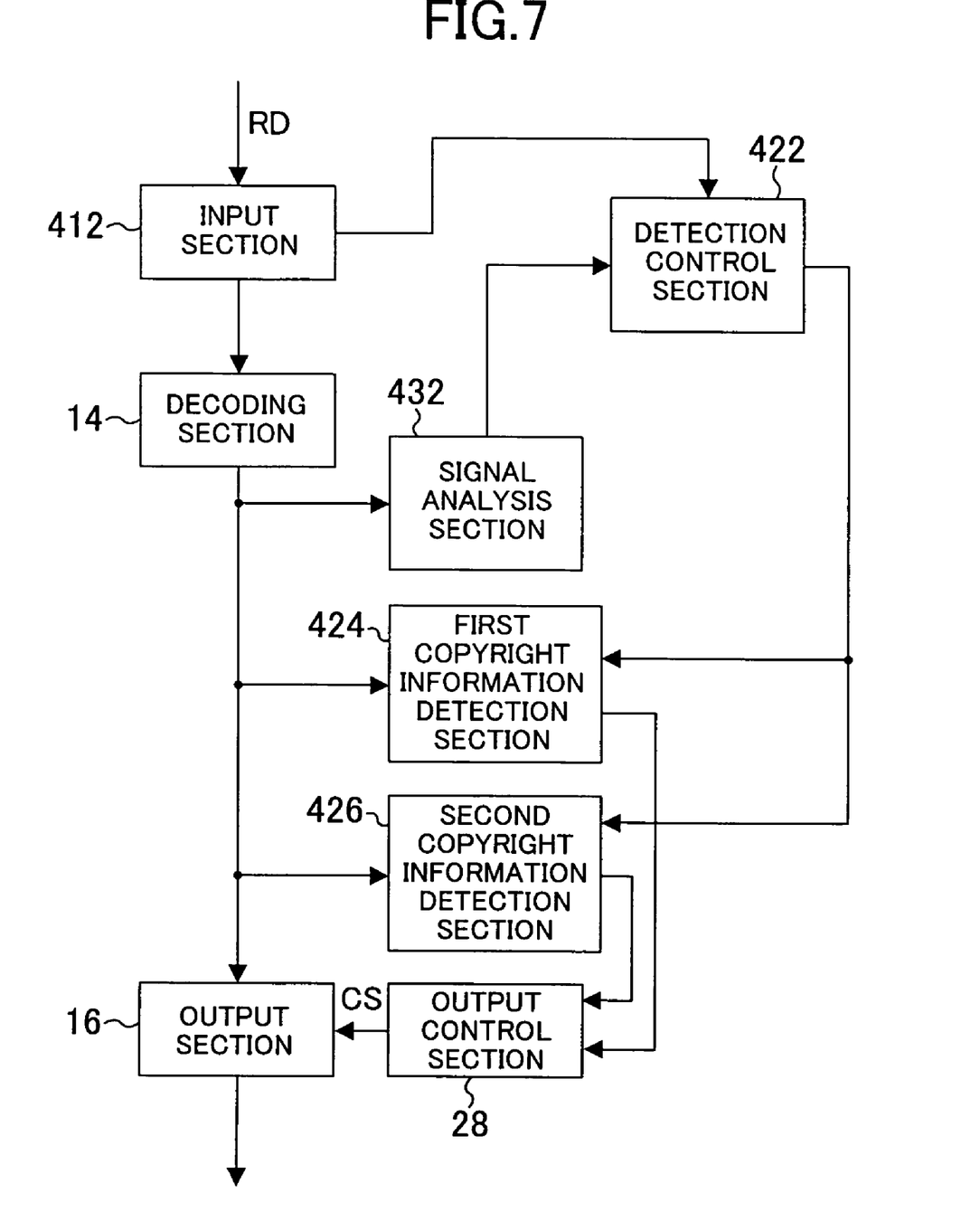
FIG. 7 is a block diagram of a decoding apparatus according to a fourth embodiment of the present invention.

FIG. 7 is a block diagram of a decoding apparatus according to a fourth embodiment of the present invention. The decoding apparatus of FIG. 7 includes an input section 412, a detection control section 422, a first copyright information detection section 424, and a second copyright information detection section 426 in place of the input section 12, the detection control section 22, the first copyright information detection section 24, and the second copyright information detection section 26 of the decoding apparatus of FIG. 1, respectively, and further includes a signal analysis section 432. In FIG. 7, the same members as those described with reference to FIG. 1 are identified by the same reference numerals and the description thereof will be omitted herein.

In the decoding apparatus of FIG. 7, operations of the plurality of copyright information detection sections are controlled in accordance with the characteristics of decoded video or audio data, or in accordance with information on encoding obtained from encoded video or audio data.

The input section 412 of FIG. 7 divides input data RD into encoded video data and encoded audio data and outputs the encoded video and audio data to the decoding section 14, while extracting information on encoding from the encoded video or audio data so as to output the extracted information to the detection control section 422. The signal analysis section 432 detects the characteristics of the video or audio data decoded by the decoding section 14 by carrying out signal analysis, determines the type of the contents, and outputs the result to the detection control section 422.

The first and second copyright information detection sections 424 and 426 operate in the same manner as the first and second copyright information detection sections 324 and 326 of FIG. 5, respectively, except that the first and second copyright information detection sections 424 and 426 operate under control of the detection control section 422 instead of control of the detection control section 322.

The signal analysis section 432 detects, for example, the dynamic range of the audio data as the characteristic of the decoded data. If the audio data is a signal having a wide continuous dynamic range, the signal analysis section 432 determines that the contents of that audio data are music contents.

The signal analysis section 432 may detect the lengths of silent intervals or the number of silent intervals in the audio data. If the signal has many silent intervals, the signal analysis section 432 determines that the contents of the audio data are movie contents, and on the other hand, if the signal has a small number of silent intervals, the signal analysis section 432 determines that the contents of the audio data are music contents.

Alternatively, the signal analysis section 432 may detect the amplitude of a signal indicated by surround channel data. If amplitude at a certain level continues in the surround channel, the signal analysis section 432 determines that the contents of the audio data are music contents.

The detection control section 422 may receive information from the input section 412 and determine the kind of the contents of the input data. For example, the input section 412 extracts information on the audio encoding method and the detection control section 422 determines the kind of the contents according to this information. This is effective in cases where different encoding methods are used to encode movie contents and music contents.

Also, the input section 412 may extract information on the bit rate of the encoded audio or video data, and the detection control section 422 may determine the kind of the contents in accordance with this information. This is effective in cases where different bit rates are used to encode movie contents and music contents.

Furthermore, the input section 412 may extract information on the video encoding method, and the detection control section 422 may determine the kind of the contents in accordance with this information. This is effective in cases where different video encoding methods are used to encode movie contents and music contents.

When the signal analysis section 432 or the detection control section 422 itself has determined that the contents of input data are music contents, for example, the detection control section 422 makes the first copyright information detection section 424 operate. On the other hand, when it has been determined that the contents of the input data are movie contents, for example, the detection control section 422 makes the second copyright information detection section 426 operate. The output control section 28 functions in the same manner as in the decoding apparatus of FIG. 1 except that the output control section 28 generates an output control signal CS according to the outputs of the first and second copyright information detection sections 424 and 426.

Figure 8:
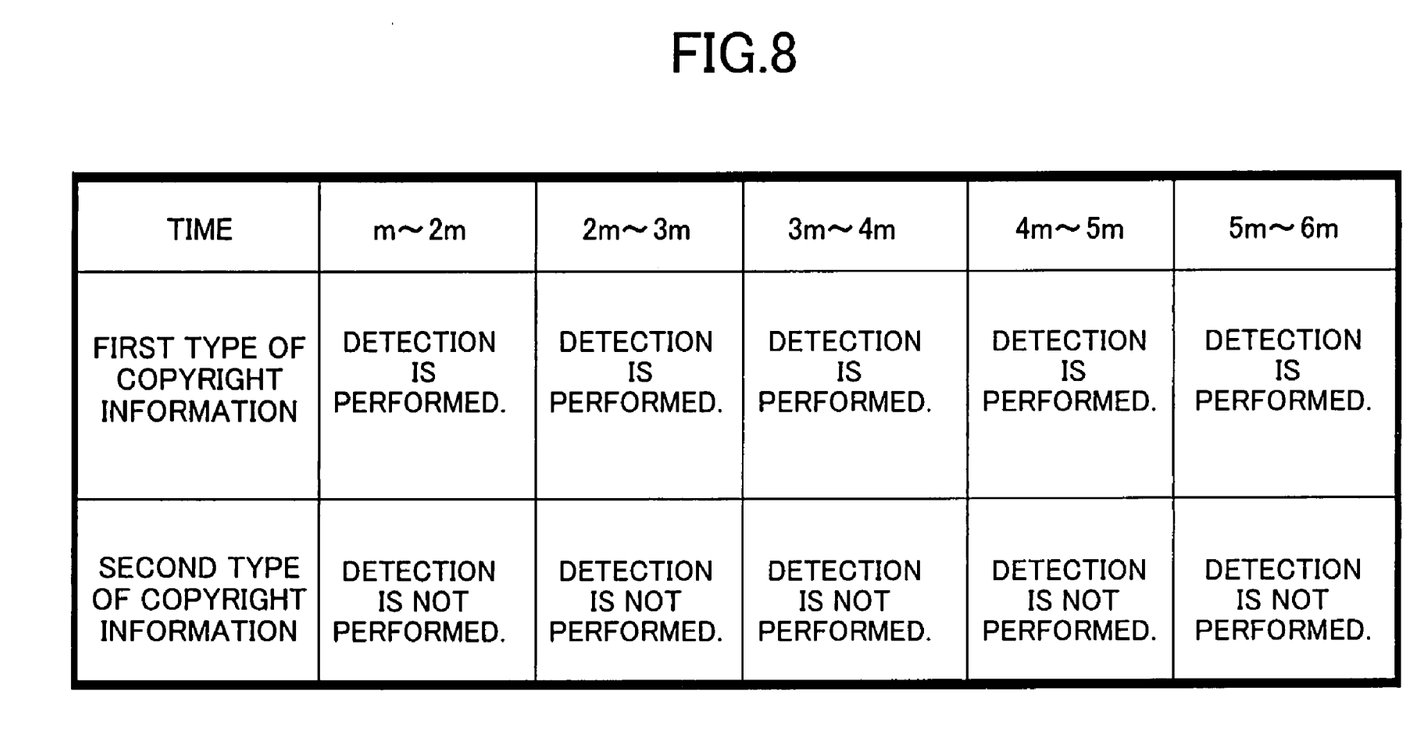
FIG. 8 is an explanatory view illustrating time periods in which first and second copyright information detection sections of FIG. 7 perform copyright information detection process.

FIG. 8 is an explanatory view illustrating time periods in which the first and second copyright information detection sections 424 and 426 of FIG. 7 perform copyright information detection process. FIG. 8 indicates a case in which the contents of input data have been determined to be music contents, for example. In this case, only the first copyright information detection section 424 is operated. Depending upon determination result obtained by the signal analysis section 432 or the detection control section 422, both of the first and second copyright information detection sections 424 and 426 may be operated.

As described above, in the decoding apparatus of FIG. 7, it is also not necessary to operate the two copyright information detection sections at all times, which allows the two types of copyright information to be detected with the amount of required computation being reduced.

Although the output control section 28 and the detection control section 422 are provided in the foregoing description, these sections may be realized as a single control section.

Furthermore, in the foregoing embodiments, two types of copyright information are embedded in decoded data and two copyright information detection sections for detecting these different types of copyright information are provided. However, three or more types of copyright information may be embedded in decoded data and three or more copyright information detection sections for detecting those different types of copyright information may be provided.

Also, although FIGS. 2, 4, 6, and 8 show examples of the time periods in which copyright information detection process is performed, the time periods for performing copyright information detection process are not limited to these examples.

Moreover, although data read from a DVD is processed in the above-described exemplary cases, the present invention is not limited to these, but data stored on other recording media, such as other optical disks and hard disks, data read from semiconductor memory, broadcast data, data received over a network, and the like may also be processed.

The above-described processing may be realized not only by hardware but also by software by using a processor. Alternatively, part of the processing may be performed by hardware and the rest may be performed by software.

As described above, the present invention, which allows multiple types of copyright information to be detected with the amount of computation being reduced, is effectively applicable to DVD players and the like and, in addition, to other optical disk players, hard disk drive players, semiconductor players, network players, and the like.

What is claimed is:

1. A decoding apparatus, comprising:
   a decoding section for decoding input encoded data;
   an output section for outputting data decoded by the decoding section, in accordance with an output control signal;
   a plurality of copyright information detection sections for detecting different types of copyright information from the data decoded by the decoding section and each outputting the detected copyright information;

an output control section for outputting the output control signal in accordance with the copyright information detected by at least one of the plurality of copyright information detection sections; and a detection control section for controlling the plurality of copyright information detection sections so that at least one of the plurality of copyright information detection sections has a period of time in which the at least one copyright information detection section does not perform process, wherein the detection control section controls the plurality of copyright information detection sections so that at least one of the plurality of copyright information detection sections does not perform process that requires an amount of computation equal to or greater than an amount of computation defined by the difference between a certain amount of computation and an amount of computation allocated to the at least one copyright information detection section.

2. The decoding apparatus of claim 1, wherein the detection control section makes one or more of the plurality of copyright information detection sections operate at all times and in accordance with a state of detection process performed by at least one of the operated copyright information detection section or sections, the detection control section makes at least one copyright information detection section that has not been operated perform detection process.

3. The decoding apparatus of claim 2, wherein when an amount of computation required for the copyright information detection by the at least one of the operated copyright information detection sections is equal to or smaller than a predetermined value, the detection control section makes at least one copyright information detection section that has not been operated perform detection process.

4. The decoding apparatus of claim 1, wherein the detection control section controls the plurality of copyright information detection sections so as to make at least one of the plurality of copyright information detection sections perform simplified computation and the rest of the plurality of copyright information detection sections perform ordinary operation.

5. The decoding apparatus of claim 1, wherein the detection control section controls the plurality of copyright information detection sections so that each of the plurality of copyright information detection sections operates in a time-shared manner.

6. The decoding apparatus of claim 1, further comprising a signal analysis section for detecting a characteristic of the data decoded by the decoding section, wherein the detection control section controls operations of the plurality of copyright information detection sections in accordance with the characteristic detected by the signal analysis section.

7. The decoding apparatus of claim 6, wherein the signal analysis section detects, as the characteristic, a dynamic range of the decoded data.

8. The decoding apparatus of claim 6, wherein the signal analysis section detects, as the characteristic, lengths of silent intervals or the number of silent intervals in the decoded data.

9. The decoding apparatus of claim 6, wherein the signal analysis section detects, as the characteristic, an amplitude of a signal indicated by certain channel's data in the decoded data.

10. The decoding apparatus of claim 1, further comprising an input section for outputting input encoded data to the decoding section and extracting information on encoding from the encoded data to output the extracted information, wherein the detection control section controls operations of the plurality of copyright information detection sections in accordance with the information on encoding extracted by the input section.

11. The decoding apparatus of claim 10, wherein the input section extracts, as the information on encoding, information on an audio encoding method.

12. The decoding apparatus of claim 10, wherein the input section extracts, as the information on encoding, information on a bit rate of the encoded data.

13. The decoding apparatus of claim 10, wherein the input section extracts, as the information on encoding, information on a video encoding method.

* * * * *